July 29, 1958     S. I. BEY     2,845,379
METHOD OF MAKING A TEMPLATE
Filed Sept. 9, 1953     2 Sheets-Sheet 1

INVENTOR.
Stanley I. Bey.
BY
Elmer Jamison Gray
ATTORNEY.

July 29, 1958  S. I. BEY  2,845,379
METHOD OF MAKING A TEMPLATE
Filed Sept. 9, 1953  2 Sheets-Sheet 2
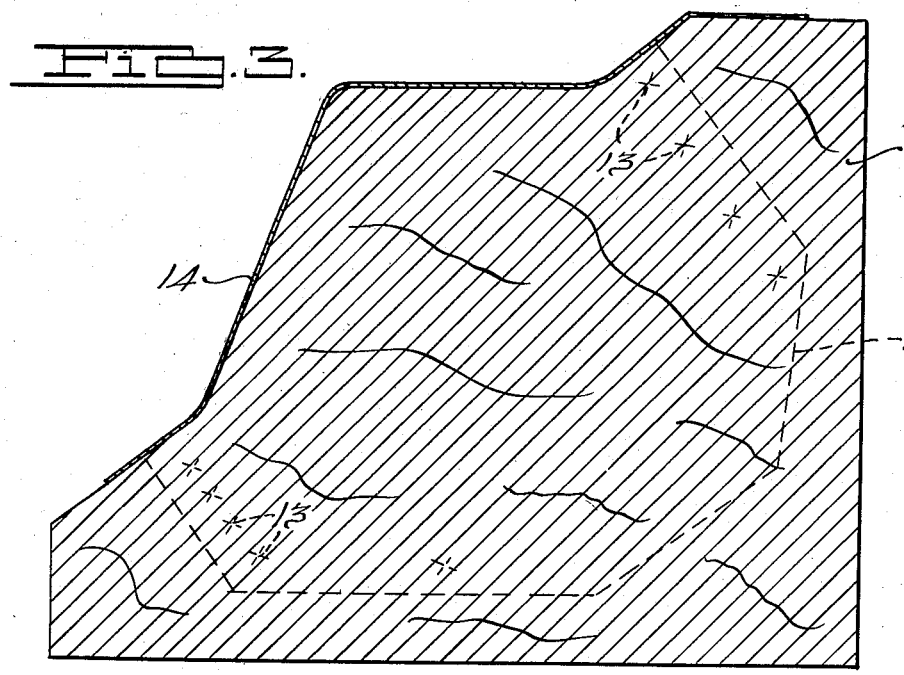
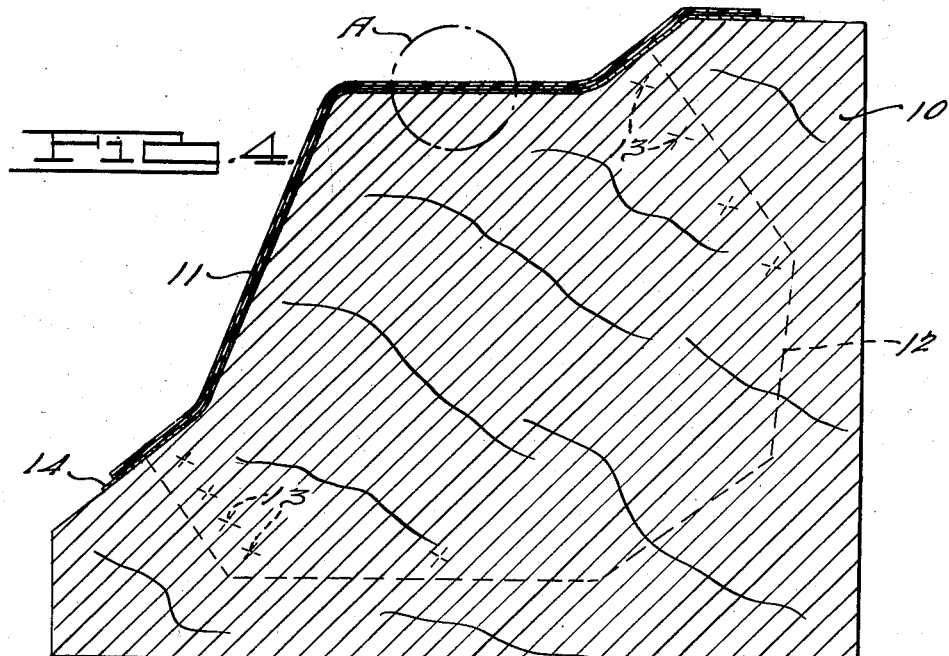
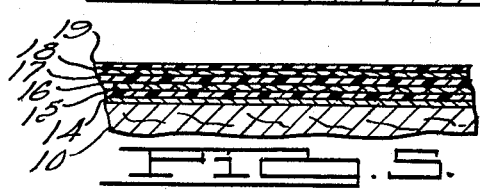
INVENTOR.
Stanley I. Bey.
BY
Elmer Jamison Gray
ATTORNEY.

United States Patent Office 2,845,379
Patented July 29, 1958

2,845,379

METHOD OF MAKING A TEMPLATE

Stanley I. Bey, Hazel Park, Mich., assignor, by mesne assignments, to Chrysler Corporation, a corporation of Delaware Application September 9, 1953, Serial No. 379,249

3 Claims. (Cl. 154—110)

This invention relates generally to templates and a method of making the same and in particular to the fabrication of transparent plastic templates capable of reproducing accurately in full scale the surface contour and shape of models, forms, templates and other objects of three dimensional form. The invention is also especially useful for the purpose of producing transparent plastic replicas of panels, stampings and other parts of automobile bodies, airplanes, etc.

An object of the invention is to provide a composite plastic template or mock panel, and method of fabricating the same, wherein the finished template or panel will duplicate in three dimensional form the surface contour and shape of a model, dummy or other object, such completed template or panel being characterized by its toughness, strength, and flexibility and its capability of maintaining accurately its shape and form. These templates may be prepared directly from various models, dummies or forms made of plaster, wood, plastic or metal and may be utilized for many time saving purposes, such as in checking or testing production tools, dies and fixtures, locating or checking holes and trim lines, preparing and checking layouts and body drafts, and in general for any purpose where it is desirable and advantageous to possess in advance of production an exact replica of a panel or part later to be made on a production basis.

In accordance with one example of the invention herein described with reference to the drawings, the surface of the model or dummy from which a template or mock panel is to be made is preferably first thoroughly waxed to produce a smooth non-adherent surface, and then coated with a thin plastic film which is allowed to set and which serves the purpose of affording good reproduction while protecting the surface of the model against marring or damage and also permits easy removal of the plastic template. A lay-up of resin and fiber glass cloth is formed over the plastic film covered surface of the model. This lay-up consists preferably of alternate layers of hardenable resin and fiber glass cloth. For example, the surface of the model may be first coated with a resinous layer, and then a layer of fiber glass cloth is laid smoothly over the resin layer. A further coating of resin is then applied over the glass cloth. Additional alternate layers of glass cloth and resin may again be applied depending upon the thickness and strength of the template desired. Regardless of the number of laminations it is understood that the final layer of glass cloth laid over the model is covered with a layer of resin and that the fibers of the glass cloth are thoroughly saturated or wetted with the liquid resin. The resin is then allowed to cure and harden, the period of which being predetermined by the inclusion of a suitable accelerator and hardener in the liquid resin. Satisfactory results have been produced by the use of a polyester resin which is allowed to cure preferably in the absence of any substantial exposure to or contact with the atmosphere, thus enabling the resin content of the template laminations or layers to cure and harden directly on the model without requiring the application of heat tending to damage the model.

The laminated plastic template or mock panel, after curing and hardening of the resin content thereof, may be easily removed from the model due to the springiness or yield of the walls of the template. Thus, the shape of the model, the absence of draft or the presence of undercut surfaces, present no deterrent to the removal or disengagement of the template from the model since the walls of the template may be sprung sufficiently to effect removal thereof. However, upon release of the stress thereon the walls will return to their original position or shape, and it has been found that the template or mock panel, due to the composition thereof, will maintain its shape or contour accurately and with exact fidelity. It will be understood that the template, after curing and hardening of the plastic content thereof, may be separated from the model without damage to the surfaces of the model and template because the initial thin plastic film applied over the surface of the model before lay-up of the template laminations provide a parting film or layer which is non-adherent to the template. Since the surface of the model, especially in the case of a wood model, is preferably first waxed, the parting film of plastic material may, after removal of the template, be readily stripped therefrom.

The template will faithfully reproduce any scribe, layout, hole location or other lines which may initially be scored into the surface of the model. Such lines will be reproduced first in the thin parting film and thereafter in the surface of the template, and since the finished template is transparent such lines are clearly visible for checking or other purposes. For example, intersecting hole location lines may be transferred to the template and holes drilled in the template at the intersection points of these lines. Such holes enable drill fixtures to be accurately checked as to hole locations in the production panels.

Other objects of this invention will appear in the following description and appended claims, reference being had to the accompanying drawings forming a part of this specification wherein like reference characters designate corresponding parts in the several views.

Fig. 3 is a vertical section through a model illustrating the application thereto of a parting film of plastic.

Fig. 4 is a view similar to Fig. 3 illustrating a lay-up of resin and fiber glass cloth providing the laminations of the plastic template.

Fig. 5 is an enlarged section taken within the circle designated A in Fig. 4.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Figure 1:
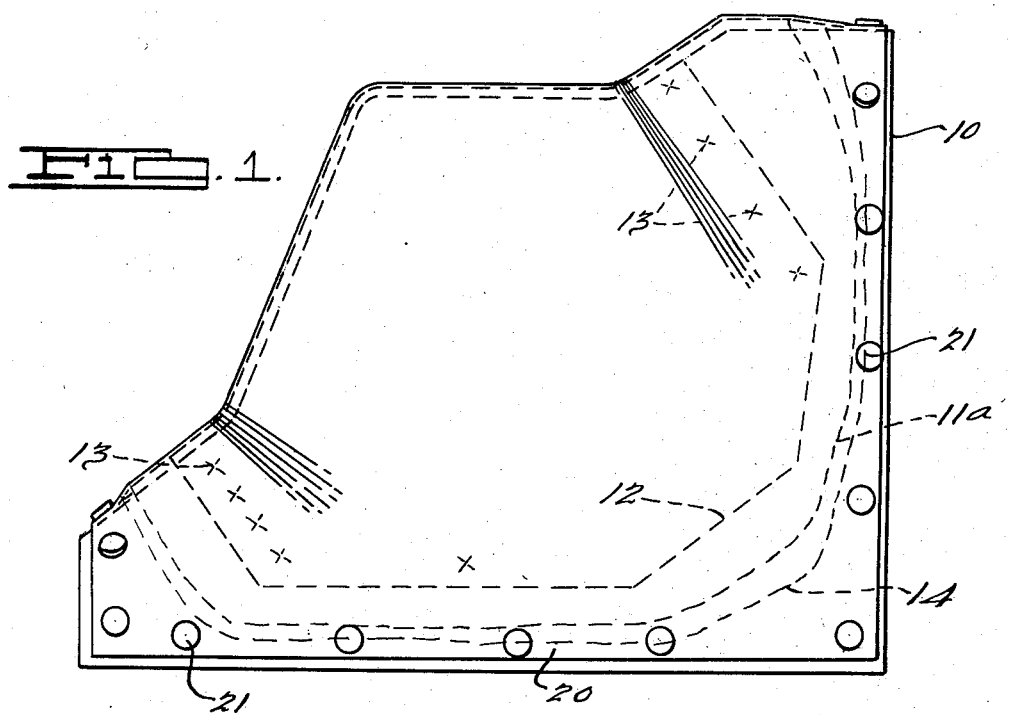
Fig. 1 is a side elevation illustrating a plastic template prepared in accordance with the invention and the manner in which the template may be cured directly on a model.
Figure 2:
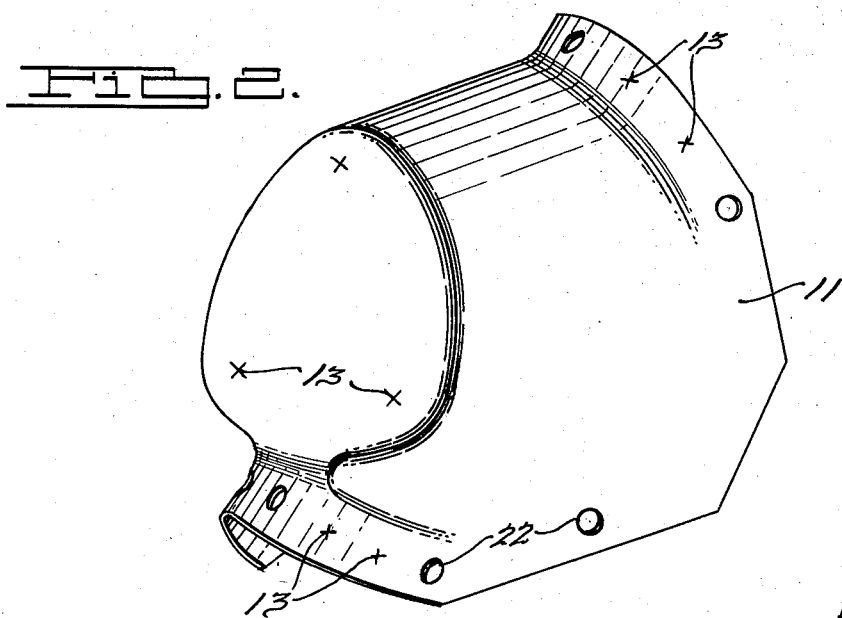
Fig. 2 is a perspective view of a finished template.

In Fig. 1 of the drawings there is illustrated, by way of example, a typical model 10 of plaster, wood or other suitable material, the surface contour of which is to be reproduced in the form of a template or mock panel illustrated at 11 in Fig. 2. The particular model and template shown in the drawings have been arbitrarily selected merely for the purpose of illustrating one application of the invention.

The surface of the model may first be scored with suitable scribe, layout, hole location or other lines that may be desired. For example, the model 10 may be scored with a line 12 indicating the final outline or marginal edge of the completed template and also may be scored with short intersecting lines 13 to indicate hole locations. Such lines 12 and 13 are shown merely for exemplification.

As previously stated the surface of the model is preferably first thoroughly waxed. Thereafter, all of the surface of the model, which comprehends the area of the template to be formed, is coated or sprayed with a film forming resinous or plastic material 14, see Fig. 3. A satisfactory liquid resin for this purpose is poly vinyl alcohol, and a very thin coating of from one-fourth to one-half thousandth of an inch has been found adequate. This film will set rapidly and when set will provide a protecting layer for the surface of the model preventing marring or damage not only to the model surface but also to any scribe lines scored in the model. This protecting layer 14 is especially advantageous in connection with clay models. It enables good reproduction to be achieved by the template and provides a parting layer non-adherent to the template laminations.

After setting of the parting film 14 the surface of the model is in prepared condition for the lay-up of the template forming laminations, illustrated by way of example in Figs. 4 and 5. Although the surface of the model outside the predetermined marginal outline of the template may be masked so that the template laminations when applied will conform substantially to the desired outline, this marginal outline may instead be scribed on the model and the template, after removal from the model, may be trimmed along this line. This latter method is employed in the illustrated example so as to obtain in the template the exact marginal outline required. The lay-up of template laminations consists of alternate layers of hardenable plastic resin and fiber glass cloth. In the example shown in Figs. 4 and 5 a thin layer of liquid plastic 15, such as a clear polyester resin, is sprayed or brushed over the parting film 14. Thereafter, before this layer 15 cures or hardens, a layer of fiber glass cloth 16 is applied. This cloth preferably is applied in separate pieces or strips which are overlapped along adjacent edges. These pieces of fiber glass cloth or fabric may be applied in dry condition or may first be saturated with the liquid polyester resin. A layer of liquid resin 17, similar to the layer or coating 15, is applied over the glass cloth 16. These three layers 15, 16 and 17 may be sufficient for the purposes of many types of templates or mock panels. If additional thickness and strength of the template is required, additional alternate layers of fiber glass cloth and resin are applied. In the example shown in Fig. 5 an additional layer 18 of fiber glass cloth is applied in the manner above described and thereafter a coating 19 of resin, similar to the coating 15, is applied thereover. As indicated in Figs. 1, 3 and 4 the lay-up of laminations 15–19 may extend beyond the area bounded by the marginal scribe line 12. In other words, in applying the lay-up care need not be taken to conform to the line 12 since the portions of the lay-up projecting irregularly beyond this line as indicated at 11a may be trimmed off after removal of the template. The scribe lines 12 and 13 will, in the completed template, be accurately reproduced as shallow ribs on the inner surface of the template and, due to the transparency thereof, will be visible from the exterior of the template.

The plastic material of the layers 15, 17 and 19 preferably contains a catalytic agent, such as cobalt, for accelerating curing of the material and also a hardening agent. Any known curing and hardening agents may be used in the resin to affect reasonably rapid curing and hardening without the application of heat, such as in an oven. The curing in the present instance, where a polyester resin is utilized, is accomplished by masking or covering the lay-up so as to exclude as much as possible contact with the atmosphere. This may be accomplished in various ways. One way would be to place the model and lay-up thereon in an enclosure and exhaust the air therefrom. Another way is illustrated in Fig. 1 wherein a sheet 20 of pliable resin, such as poly vinyl alcohol, is wrapped or stretched tightly over the lay-up so as to entirely cover the same. This sheet 20, after being stretched tightly over the lay-up, may be secured to the model beyond the margin of the lay-up, such as by tacking the same at any number of points 21 to the model. This method of conducting the resin cure in the absence of contact with the air has the further advantage of holding the lay-up or template laminations firmly down upon the model, thereby obtaining maximum fidelity of contour reproduction. The time period of curing or hardening will, of course, be governed by the amount of accelerating and hardening agents contained in the resin, it being desirable that no appreciable hardening or curing occur until after the enclosing sheet 20 has been applied and tacked tautly in position. It is also important that the fibers of the glass cloth layers be thoroughly wetted or saturated with the resin which will penetrate through the interstices between the fibers. In other words, the resin layers, with the interposed glass cloth layer or layers, will in effect flow together through the fiber interstices.

After curing and hardening of the resin and fiber glass lay-up has proceeded to completion, the cover or masking sheet 20 is removed and thereafter the template is removed from the model. Where necessary the walls of the template may be flexed or sprung apart to facilitate this operation. The excess marginal portions of the hardened lay-up may then be trimmed off along the scribe line 12 and holes 22 may be drilled through the intersecting points of the hole location scribe lines 13, as indicated in Fig. 2. In this figure the completed trimmed template or mock panel 11 is illustrated. After removal of the template from the model the parting film 14 may be readily peeled or stripped off the model.

A plastic template produced in accordance with the present invention (the term template including within its meaning a mock panel or the like) permits sufficient partial passage of light therethrough as to enable lines, holes, layouts, contour lines etc. to be viewed, checked or tested through the template and, hence, the template may be characterized as transparent. Partial visibility through the panel, adequate for its intended purposes, is achieved by reason not only of the clear plastic material utilized but also the fiber glass cloth consolidated therewith. The term model hereinafter used is intended to comprehend any object or form the surface contour or shape of which is to be reproduced by resinous plastic and fiber glass cloth or fabric layers consolidated and cured in accordance with the invention. In preparing the lay-up of template laminations the fiber glass cloth is preferably first saturated or impregnated with liquid resinous material before applying to the model, thus reducing the amount of liquid resin or one or more layers thereof applied in forming the template.

It will be apparent that many advantages are achieved by virtue of the present invention which enables an exact replica of a panel to be produced without waiting for the completion of production tools or dies. The template made from a model, such as a wood or clay model, may be used for substantially all of the comparative purposes that could be served by a production metal panel prior to the preparation of dies or hammer forms. It aids die designers, reduces labor costs, speeds up tooling from the clay model stage, and permits the use of an equivalent of a production panel in checking and testing tools, dies and fixtures.

I claim:

1. The method of reproducing an irregular surface contour of a model or article, including the steps of coating said surface with a thermoplastic parting film, applying over said coated surface separate layers of liquid thermosetting resinous plastic material and fiber glass cloth, stretching a substantially air impermeable plastic film so as to deform the latter in accordance with the contour of the outer surface of said material and cloth and securing the latter film to said model tightly over said outer surface, curing said material directly on the model to produce a flexible wall template, and removing the template from the model.

2. The method of reproducing an irregular surface contour of a model or article, including the steps of applying over said surface a hardenable liquid thermoplastic material which is non-adherent to said surface, allowing said material to harden to comprise a thin parting film covering said surface, thereafter applying over the surface of said film in separate layers a hardenable liquid resinous thermosetting plastic material and fiber glass cloth impregnated with said thermosetting plastic material, said thermosetting plastic material being nonadherent to said film, substantially precluding exposure of said thermosetting plastic material to the atmosphere by stretching tightly over the latter material and cloth, so as to conform closely to the contour thereof, a film of plastic material non-adherent to said thermosetting plastic material, securing the latter film to the model, curing said thermosetting material directly on the model to produce a flexible wall template, and removing the template from the model.

3. The method of making a transparent template to reproduce the surface contour of a model, including the steps of coating the surface of the model with a thin parting film comprising a hardenable liquid polyvinyl alcohol thermoplastic non-adherent to said surface, allowing said film to harden, then applying over the surface of said film sequentially separate layers of liquid hardenable plastic material and fiber glass cloth with the plastic material penetrating said cloth, the latter plastic material comprising a hardenable polyester thermosetting plastic nonadherent to said film, stretching tightly over said latter plastic material and cloth so as to conform closely to the contour thereof a polyvinyl alcohol plastic film nonadherent to said latter plastic material and substantially impervious to the atmosphere, curing said latter plastic material directly on the model to form a transparent template, and removing the template from the model.

References Cited in the file of this patent

UNITED STATES PATENTS

| | | |
|---|---|---|
| 1,352,436 | Dickey | Sept. 14, 1920 |
| 1,441,133 | Taylor | Jan. 2, 1923 |
| 2,287,270 | Partridge | June 23, 1942 |
| 2,556,078 | Francis | June 5, 1951 |
| 2,592,316 | Moss | Apr. 8, 1952 |
| 2,614,058 | Francis | Oct. 14, 1952 |
| 2,625,748 | Renaud | Jan. 20, 1953 |
| 2,664,375 | Slayter | Dec. 29, 1953 |
| 2,722,962 | Hampshire et al. | Nov. 8, 1955 |

FOREIGN PATENTS

| | | |
|---|---|---|
| 537,412 | Germany | Nov. 2, 1931 |
| 625,255 | Great Britain | Aug. 4, 1949 |